United States Patent [19]
Anderson

[11] 4,017,764
[45] Apr. 12, 1977

[54] ELECTRODELESS FLUORESCENT LAMP HAVING A RADIO FREQUENCY GAS DISCHARGE EXCITED BY A CLOSED LOOP MAGNETIC CORE

[75] Inventor: John M. Anderson, Scotia, N.Y.

[73] Assignee: General Electric Company, Schenectady, N.Y.

[22] Filed: Dec. 18, 1975

[21] Appl. No.: 642,142

Related U.S. Application Data

[63] Continuation-in-part of Ser. No. 542,374, Jan. 20, 1975, abandoned.

[52] U.S. Cl. .............................. 315/248; 315/57; 315/267; 315/348
[51] Int. Cl.² ........................................ H05B 41/24
[58] Field of Search ............ 315/39, 71, 248, 267, 315/57, 344, 348

[56] References Cited
UNITED STATES PATENTS

| | | | |
|---|---|---|---|
| 966,204 | 7/1904 | Hewitt | 315/248 |
| 2,030,957 | 2/1936 | Bethenod et al. | 315/248 |
| 2,118,452 | 5/1938 | LeBel | 315/248 |
| 3,500,118 | 3/1970 | Anderson | 315/57 |
| 3,521,120 | 7/1970 | Anderson | 315/57 |
| 3,551,742 | 12/1970 | Gruzdev et al. | 315/248 |
| 3,611,009 | 12/1971 | McNeil | 315/57 |

*Primary Examiner*—Eugene R. LaRoche
*Attorney, Agent, or Firm*—Jack E. Haken; Joseph T. Cohen; Jerome C. Squillaro

[57] ABSTRACT

An electrodeless fluorescent lamp adapted for economical substitution in place of existing incandescent lamps comprises an ionizable medium contained within a phosphor coated globular envelope. A closed loop, magnetic core, which may be ferrite, is contained within the ionizable medium to induce an electric field, ionize the medium, and stimulate visible light output. The core, which may be coated with glassy material, is energized by a radio frequency power source in the lamp base structure. Current from the power supply is transmitted to the core by means of a metal rod structure which also serves to transfer heat from within the envelope. A secondary winding on the core provides high starting voltages to initiate a glow discharge.

51 Claims, 12 Drawing Figures

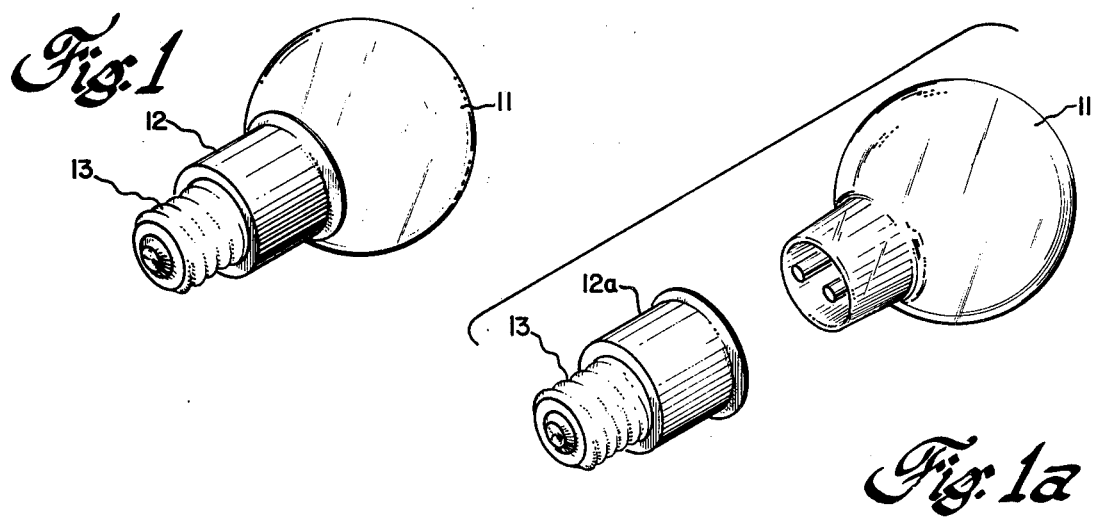
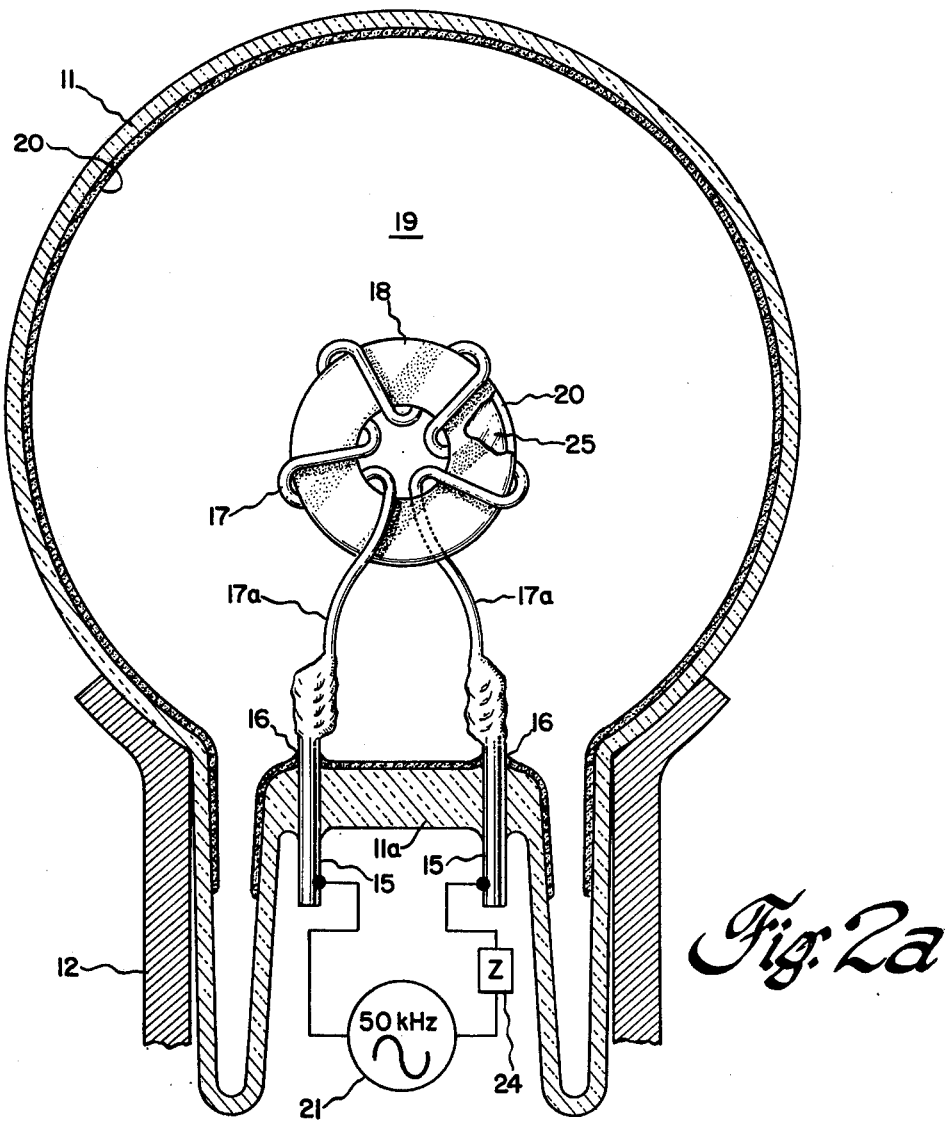

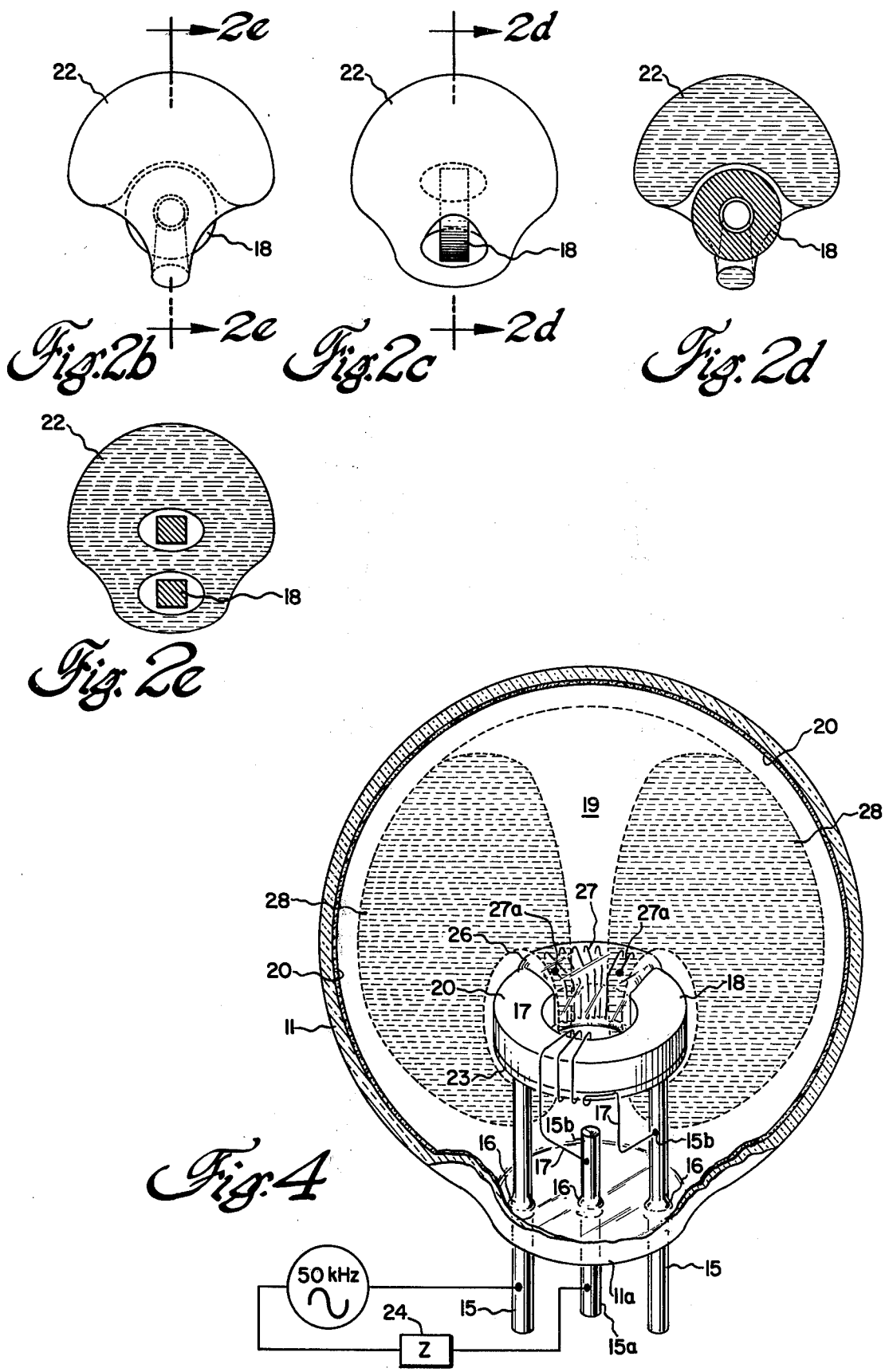

ELECTRODELESS FLUORESCENT LAMP HAVING A RADIO FREQUENCY GAS DISCHARGE EXCITED BY A CLOSED LOOP MAGNETIC CORE

CROSS REFERENCE, CONCURRENT APPLICATION AND INCORPORATION BY REFERENCE

This is a continuation-in-part of U.S. Pat. application Ser. No. 542,374 filed Jan. 20, 1975 now abandoned.

Portions of the matter herein disclosed are the subject of claims in concurrently filed U.S. Pat. applications Ser. No. 642,143, John M. Anderson; Ser. No. 642,148, John M. Anderson; and Ser. No. 642,056, Homer H. Glascock and John M. Anderson, all of said patent applications having been assigned to the assignee of this patent application. The principles of operation of induction ionized fluorescent lamps using ferrite core transformers are disclosed in U.S. Pat. No. 3,500,118 issued Mar. 10, 1970 and 3,521,120 issued July 21, 1970 to John M. Anderson.

The above-mentioned disclosures are hereby incorporated by reference into this patent application.

BACKGROUND OF THE INVENTION

This invention relates to fluorescent lamps which are adapted as direct replacements for existing incandescent lamps. More specifically, this invention concerns fluorescent lamps wherein ionization is induced by a transformer contained within the lamp envelope.

The incandescent lamp is the primary luminary for household and residential lighting. This lamp generally includes an incandescent filament within a predetermined nonoxidizing atmosphere which is contained within a tear drop shaped envelope and mounted, for example, within an Edison type base which is screwed into a permanent fixture or into a movable socket.

Despite their widespread use, incandescent lamps are relatively inefficient, producing only 15–17 lumens per watt of input power and have relatively short, unpredictable service lives. Fluorescent lamps, which have efficiencies as high as 80 lumens per watt, provide an attractive alternative to incandescent lighting. Conventional fluorescent lamps, however, require a long tubular envelope which, together with the need for auxiliary ballasting equipment, has somewhat limited their acceptance in the home lighting market. Increased residential use of fluorescent illumination, with attendant savings of energy, can be achieved from the development of fluorescent lamps which are directly compatible with existing sockets and incandescent lamp fixtures.

The electric lamp technology has long sought electric discharge devices which produce visible light for general illumination purposes without the utilization of electrodes as the foot-points of a glow or arc discharge. Although the concept of electrodeless discharge lamp is very old, such lamps have always included the concept of coupling electrical energy into an hermetically sealed gas-containing envelope by means of a ferromagnetic or air core transformer to avoid the use of electrodes. Such devices have never proved practical or commercially feasible, because it has been impossible to achieve any reasonable efficiency of light emission due to the utilization of iron or air core transformers because of core losses, among other factors.

It has been proposed in the prior art to excite electrodeless gaseous discharge lamps using electromagnetic induction to transfer electric energy into the discharge vessel. Experiments along this line disclose that heretofore such means have been highly impracticable. If an air core transformer is utilized, the inefficiency of the coupling procedure required to achieve a reasonable power input to the gaseous discharge results in a loss of power by radiation which is prohibitive, and which may be dangerous. Accordingly, such devices have never been successfully operated for useful periods at any reasonable efficiency.

Another alternative that has been proposed in the prior art is the utilization of an iron or ferromagnetic cores. Such cores, however, may be utilized only at very low frequencies in order that eddy current heating of the iron does not cause core failure. Utilizing alternating current, it is exceedingly difficult to operate an iron core transformer for the purpose of transferring energy of this nature at frequencies in excess of 5 or 10 kilohertz. Based upon experimental and calculated results obtained in this laboratory, it has been determined that for an iron core transformer operating at 50 kHz, core power losses are in the range of approximately 80 to 90 percent. Accordingly, from the foregoing it may readily be appreciated that air core and iron core transformers are, from a practical point of view, inoperative at the high radio frequency levels that are necessary for efficient operation of gaseous discharge lamps in accord with this invention.

In my prior U.S. Pat. No. 3,500,118 and 3,521,120, I disclosed designs for fluorescent lamps which utilize a magnetically induced radio frequency electric field to ionize a gaseous radiating medium. The elimination of discharge electrodes within these lamp envelopes substantially increases their life and allows lamp shapes which are more compatible with home lighting needs.

My patent 3,500,118, issued Mar. 10, 1970 describes an improved electrodeless fluorescent lamp having supply, radio frequency power supply. This design, while quite useful, was bulky, comprising a large tubular discharge ring, several ferrite cores, and a remotely mounted power supply which made it unsuitable for use in many industrial and residential applications.

My later U.S. Pat. No. 3,521,120 issued July 21, 1970 described a more compact lamp configuration. However, this lamp maintained a high frequency magnetic field in the air surrounding the envelope and thus constituted an unacceptable source of electromagnetic radiation and interference.

SUMMARY OF THE INVENTION

Briefly stated, this invention provides a fluorescent lamp which may be constructed within a globular or tear drop shaped structure typical of residential incandescent lamps. An annular magnetic core contained within the lamp envelope is excited with a radio frequency magnetic field. The field induces an ionizing electric discharge in a gaseous medium within the envelope. Radiation emitted from the gas excites a conventional lamp phosphor on the inner surface of the envelope and/or on the outer surface of the core to produce visible light. The core may be coated with a glassy layer to maintain vacuum integrity and to facilitate coating with the phosphor. Conductive means are provided to remove heat generated within the core from the lamp envelope.

Accordingly, it is an object of this invention to provide a fluorescent lamp suitable for economic substitution in place of the conventional, incandescent type lamp.

Another object of this invention is to provide a fluorescent lamp within the envelope dimensions typical of residential, incandescent lamps.

Another object of this invention is to provide a fluorescent lamp structure which may be utilized in conventional residential incandescent lamp sockets without the addition of external, auxiliary ballasting components.

Yet another object of this invention is to provide an improved, induction ionized, fluorescent lamp, suitable for use as an incandescent lamp substitute, having substantially reduced electromagnetic interference properties.

BRIEF DESCRIPTION OF THE DRAWINGS

The novel features believed to be characteristic of the present invention are set forth in the appended claims. The invention itself, together with further objects and advantages thereof, may be best understood with reference to the following detailed description, taken in connection with the appended drawings in which:

FIGS. 1 and 1a are complete fluorescent lamp assemblies.

FIG. 2a is a front view of a lamp embodiment having a transformer axis perpendicular to the base leads, FIG. 2b is a partial front view of the plasma within the lamp of FIG. 2a, FIG. 2c is a side view of the plasma of FIG. 2b, FIGS. 2d and 2e are sectional views of the plasma of FIGS. 2b and 2c, FIGS. 3a and 3b are sectional views of a transformer core assembly incorporating a circumferential heat transfer strap, FIG. 4 is a front view of a lamp embodiment having a transformer axis parallel to the base leads.

DESCRIPTION OF THE PREFERRED EMBODIMENTS

Figure 5:
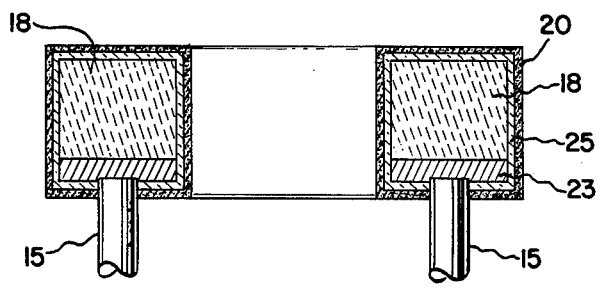
FIG. 5 is a sectional view of a transformer core embodiment including an axial heat transfer ring.

The principles of operation of electrodeless fluorescent lamps are described in my U.S. Pat. No. 3,500,118 and 3,521,120 which are incorporated herein by reference. FIG. 1 is an external view of a lamp structure which may incorporate parallel or perpendicular transformer core orientations hereinafter described. A phosphor coated lighttransmissive envelope 11 contains an ionizable gas and an exciting transformer (not shown). A solid state power supply and ballasting circuit are enclosed in a base assembly 12 which is attached to the lamp envelope 11. A standard Edison screw plug 13 incorporated into the base assembly 12 is adapted for receiving energy from conventional incandescent lamp sockets. The completed structure resembles a conventional incandescent lamp with, for example, an envelope diameter or 7.6 cm. (sometimes referred to as a size A-24 envelope) and is compatible with luminaires designed for that configuration. The base assembly may be permanently bonded to envelope 11 (FIG. 1) or may be in detachable form 12A (FIG. 1a) to permit separate replacement of repair of individual lamp components.

A preferred orientation for the internal lamp components is shown in front sectional view in FIG. 2a. A substantially globular or tear drop shaped evacuable lamp envelope 11, which may be glass, is formed using techniques well known to the lamp art. One portion of the lamp envelope forms base 11a which is pierced by two metallic support rods 15 which are bonded to the glass, in any conventional manner, to form vacuum seals 16. A winding of electrically conductive material 17 which may be insulated with, for example, glass fiber cloth, is connected between the metallic support rods 15 and linked through a closed loop magnetic transformer core 18 which is thereby supported within the lamp envelope 11. In this embodiment winding ends 17a are oriented to position the axis of the core 18 perpendicular to support rods 15. The specific winding configuration is determined by the operating input voltage of the lamp. Typically, the windings may be chosen to allow one turn on the core for each 5 bolts of winding input voltage.

The space within the envelope contains an ionizable gas 19, which may be chemically identical with that used in conventional fluorescent lamps and may comprise a mixture of a rare gas, for example krypton and/or argon, with mercury vapor and/or cadmium vapor. The internal surface of the glass envelope 11 and the external surfaces of the transformer core 18 are coated with an appropriate ultraviolet-to-visible fluorescent phosphor 20, such, as calcium halo-apatite, which phosphors are well known to the art. These phosphors are capable of absorbing the ultraviolet radiation of mercury vapor which is generally peaked at about 2537 A and, upon stimulation thereby, emitting radiation within the visible spectrum to produce a highly efficient and pleasing light output. In this embodiment of the invention, the ionized gas is not relied upon to produce substantial light emission, but rather, to produce radiation which causes light to be emitted from a fluorescent phosphor. As is well known to those skilled in the art, this system allows a relatively efficient power utilization since the gas itself is not relied upon for the necessary light emission but only for the emission of radiation to stimulate the phosphor. A source of radio frequency electrical power 21 mounted external to the lamp envelope, and preferably within the base assembly causes current to flow through the support rods 15 and transformer primary winding 17 thereby energizing the core 18 with a magnetic field. The core induces an electrical current flow in the gas 19, ionizing that gas, and stimulating the emission of ultraviolet radiation at approximately 2537 A.

In a manner typical of conventional discharge lamps, the ionized gas presents a negative impedance electrical load which would destroy an unprotected low impedance power source. A ballast impedance 24 may, for example, be connected in series with the power source 21 and a support rod 15, in a conventional manner, to provide sufficient positive impedance to balance the negative impedance of the gas so as to present the power supply with a positive impedance load; assuring stable operation. Alternately, current limiting means may be built into the power source 21 to provide an active ballasting function.

Obviously, the choice of core material is an important factor in enabling operation of this lamp. Whereas prior art literature has described similar lamp configurations having air or iron cores, I have determined that the losses inherent in the operation of these prior art cores preclude the construction of a practical lamp. As indicated in the referenced patents, ferrite or similar materials must be chosen to provide high permeability and low internal heat loss at the operating frequency. As is well known to the art, a ferrite is a ceramic-like material characterized by ferrimagnetic properties and usually exhibits a spinel structure having a cubic crystal lattice and has, for example, the generalized formula $Me.Fe_2O_4$ wherein Me represents a metal atom.

In accord with the present invention, it is necessary that the cores utilized be of such material and configuration that the core losses are not greater than 50 percent in order that effective coupling of electromagnetic energy into the light source may be effected. Similarly, low core losses reduce heating of the core and minimize the possibility of failure and maximize its efficiency. Preferably, core losses are maintained to less than 25 percent of the total input power at the operating temperature of the lamp.

A high permeability core material is necessary to assure adequate coupling of radio frequency energy to the gas with minimum electromagnetic radiation. A core having a relative permeability of at least 2000 is preferable. Suitable ferrites are available having these characteristics over the frequency range from 25 kHz to 1 MHz. High frequency operation is desirable from the standpoint of minimizing core losses; but the cost of presently available semiconductors for use in the radio frequency power source 21 limits the maximum frequency at which a practical, economical lamp may be operated to approximately 50 kHz. Among other materials, I have found ferrite Type 8100, manufactured by the Indiana General Corp. of Keysbee, New Jersey and characterized by losses of less than 120 mw. $cm^{-3}$ at 1000 gauss peak flux density (at operating temperature) for 50 kHz operation to be suitable for use in this lamp.

It is also possible to construct the core from other materials having lower magnetic permeability, for example a composite of powdered ferrite in polyimide resin having a permeability as low as 40. In such a lamp the ampere-turns of the exciting winding must, of course, be increased proportionately.

In a typical 40 watt lamp, for example, the transformer core 18 has a thickness of 1.3 cm., an inside diameter of 3 cm., and an outside diameter of 5 cm. The magnetic flux density within the core is approximately 1000 gauss.

While it is possible to use a bare ferrite core within the vacuum envelope, I have found it desirable to glaze the core 18 with an impermeable glassy layer 25 prior to coating with the phosphor 20. The glassy layer assures minimal outgassing of the ferrite ceramic and allows use of conventional Lehring techniques in the application of the phosphor coating 20. The core may, if desired, be split into two or more sections to permit economical assembly for the lamp.

In operation, the ionized gas forms a plasma linking the transformer core. The shape of this plasma may be adjusted by varying the total gas pressure within the lamp over the range from approximately 0.2 to approximately 3.0 torr. I have found that a gas pressure of approximately 1 torr produces a gas plasma which uniformly illuminates the lamp. [1 6 1] Unless otherwise noted, all gas pressures stated herein are measured at room temperature.

The shape of a typical plasma 22 is illustrated in FIGS. 2b and 2c together with sectional FIGS. 2d and 2e. (In these view all lamp components, with the exception of the transformer core 18, have been omitted to improve clarity.)

Despite the improved efficiency of the above-mentioned ferrite materials, upwards of 10 watts of heat must be dissipated by the transformer core of a 40 watt lamp. Since the core of this lamp operates substantially in vacuum, heat dissipation is a critical problem. For example, it is known that the Curie points of ferrite materials suitable for use in this application may lie below 150° C, and further, phosphor efficiencies decrease at temperatures above 120°C. Hence, these temperatures necessitate lamp designs which will maintain lamp operation below these temperatures.

Figure 3B:
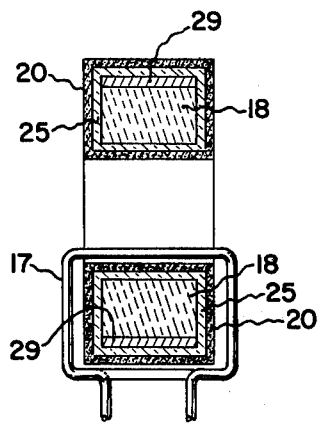
Figure 3A:
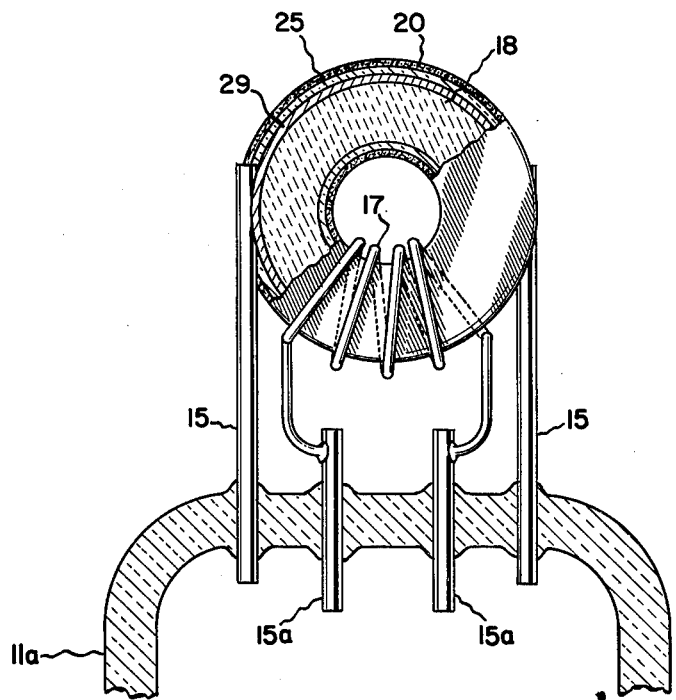

FIGS. 3a and 3b illustrate a core heating dissipating structure which is suitable for use with the lamp embodiment of FIG. 2. A metal strap 29 is bonded to the outer circumference of the core 18 and is welded to support rods 15. A glass layer 25 may be applied over the core 18 and metal strap 29 to provide thermal contact and a base for the phosphor 20. The support rods 15 conduct heat through the lamp envelope base 11a. Electrical connection to the transformer primary 17 may be made through two electrical connecting rods 15a or in the manner shown in FIG. 4.

A lamp embodiment which increases heat dissipation and provides uniform phosphor illumination is illustrated in FIG. 4 discussed below. In this lamp, a glass envelope 11 with base 11a is constructed in a manner similar to that of the embodiment of FIG. 2a. The base is pierced by two support rods 15 and an electrical contact rod 15a having vacuum seals 16. One face of an annular core 18 is bonded shown). a metal heat dissipating ring 23 which in turn if welded to and supported by the support rods 15. A primary electrical winding 17 is wrapped on the core and connected 15b between electrical contact rod 15a and one of the support rods 15. In a manner similar to that of the embodiment of FIG. 2a the primary winding is connected through rods 15 and 15a to a ballast impedance 24 and radio frequency power supply 21 which energizes the core 18. Heat generated within the core is thereby efficiently conducted to the ring 23 and thence to the support rods 15 through which it is conducted from the vacuum envelope 11.

FIG. 5 illustrates the details of the core construction used in this lamp. The metal ring 23 is bonded to one face of the core 18. The ring 23 may be copper, aluminum, beryllium, or any other material having a high thermal conductivity as compared with the core. Support rods 15 are welded to the ring 23 and provide a heat conduction path from the core to the outside of the vacuum envelope (not shonw). A glassy layer 25 is applied over the core 18 and metal ring 23 to assure good thermal bonding, minimize outgassing, and to provide a base for the phosphor 20.

In accord with a further embodiment of the present invention, I provide an instantaneously starting lamp. As is well known to the art, although a relatively low voltage is sufficient to maintain a gaseous arc discharge in operation, once the arc has been struck, a high voltage is generally required to cause initial breakdown. This is so, even in the presence of a readily ionizable inert gas, such as argon, to cause an initial breakdown to facilitate ionization of mercury, the common discharge carrying metallic vapor utilized in gaseous vapor discharge lamps. In many instances, this high voltage for starting is provided by a mechanical starter, with capacitive or inductive elements, which suddenly separates causing a high voltage surge to electrodes of the device in order to cause initial ionization. Alternative arrangements involve the use of ballast transformers to provide the necessary voltage. In accord with the present invention, I find that this problem may be rapidly, inexpensively, and easily solved by my discovery that an auxiliary secondary winding upon the core, with sufficient turns to cause it to operate as a step-up secondary, may be utilized to tap off a very high voltage which may be applied to the lamp to cause the induction of a high starting voltage, which rapidly causes the initial breakdown necessary for operation of lamps in accord with the present invention.

FIG. 4 also illustrates one method of starting ionization in the gas 19. A high voltage secondary winding 27 is applied to core 18 and covered with a glass layer. When initially energized, the magnetic field within the core induces a high voltage across the winding ends 27a forming a glow discharge between them and thereby initially ionizing the gas 19. The plasma 28 in this lamp takes the form of a hollow toroid which surrounds the core structure of the lamp.

The saturation flux density in the core 18 must be sufficiently high to allow development of the starting voltage. For lamps of the present examples the saturation flux density must be at least 1500 gauss and 750 gauss for 50 kHz and 100 kHz operation, respectively.

Figure 6:
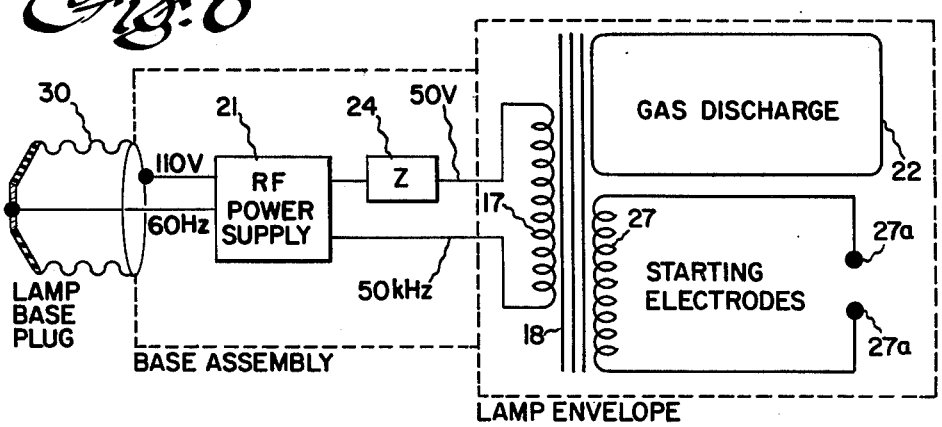
FIG. 6 is a schematic representation of the operating circuit for the lamps of this invention.

FIG. 6 illustrates schematically an electrical circuit useful in the operation of these lamps. The radio frequency power source 21 receives power at line voltage and frequency from the Edison screw plug 34 and provides an output at approximately 50 volts at 50 kHz for exciting the transformer core 18 through primary winding 17. The winding ends 27a are energized by high voltage secondary winding 27 to produce a glow discharge within the lamp. The plasma 22 thereby formed within the lamp then forms a signal turn secondary winding drawing power through the transformer core 18. A ballast impedance 24 connected in series with the radio frequency power source 21 and primary winding 17, limits plasma current to insure stable operation.

The radio frequency power source may be of any type known to the art. For example, the inverter circuit which is described in my U.S. Pat. No. 3,521,120 would be suitable for use with lamps operating in its power range.

From the foregoing description, those skilled in the art can appreciate that my invention provides a lamp which is physically and electrically compatible with existing residential incandescent lamps. This fluorescent lamp may be used in existing incandescent sockets and will provide up to three times the light output of comparable existing units. The lamp contains no electrodes within the vacuum envelope and thereby eliminates one of the major causes of failure in conventional fluorescent lamps. The high frequency magnetic field associated with the induction of gas ionization is confined to a closed magnetic path, thus minimizing electromagnetic interference.

Lamps constructed in accord with the preferred embodiment of the present invention are highly useful in that the electrodes which are the source of many of the limitations in present day fluorescent lamps are eliminated. Thus, for example, burnout of an electrode can never be the cause of a failure of a lamp in accord with the present invention. Similarly, sputtering of electrode materials upon the interior surface of the lamp walls, causing darkening thereof, is completely eliminated.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:
1. An improved fluorescent lamp comprising:
an evacuable, light-transmissive envelope having a substantially globular upper shell;
a closed loop magnetic core contained within said envelope;
means for energizing said core with a radio frequency magnetic field;
a gaseous medium within said envelope adapted to sustain an electric discharge due to an electric field induced therein by said magnetic core and to emit radiation at a first wavelength when sustaining said discharge; and
a luminescent phosphor at least on the interior of said envelope adapted to emit visible light when excited by said first wavelength radiation.

2. The lamp of claim 1 wherein said core has a magnetic permeability of at least 40 and a power loss of not more than 50 percent at the operating temperature of said lamp.

3. The lamp of claim 2 wherein said lamp core has a power loss of not more than 25 percent at the operating temperature of said lamp.

4. The lamp of claim 3 wherein said core comprises ferrite.

5. The lamp of claim 1 wherein said means for energizing said core comprises:
a plurality of substantially parallel metal support rods piercing said envelope at a base portion thereof;
a first winding having a plurality of turns linking said core and connected to said rods for providing radio frequency energy to said core; and means for providing said radio frequency energy.

6. The lamp of claim 5 wherein said means for providing said radio frequency energy comprises a power spply, adapted for the conversion of input energy to output, radio frequency energy.

7. The lamp of claim 6 wherein said power supply is mounted within a cylindrical member having a first end and an opposite end, said first end being attached to the outside of said envelope base portion, and further comprising:
a lamp base plug, adapted for insertion in a lamp socket and for receipt of said input energy therefrom, attached to said opposite end of said cylindrical member,
said power supply being connected to said lamp base plug for receipt therefrom of said input energy, said power supply further being connected to said rods for transmission of said output radio frequency energy.

8. The lamp of claim 7 wherein said cylindrical member is removably attached to said envelope base portion.

9. The lamp of claim 6 wherein said power supply provides radio frequency energy to said winding at a voltage equal to approximately 5 volts multiplied by the number of winding turns comprising said first winding.

10. The lamp of claim 6 wherein said radio frequency energy has a frequency between approximately 25 kHz and approximately 1 MHz.

11. The lamp of claim 10 wherein said radio frequency energy has a frequency of approximately 50 kHz.

12. The lamp of claim 11 wherein said magnetic core has a saturation magnetic flux density of at least 1500 gauss at the operating temperature of the lamp.

13. The lamp of claim 5 wherein said core is coated with a glassy material impermeable to gas and adapted for the receipt of said phosphor.

14. The lamp of claim 13 wherein said core is bonded to a metallic heat-transmissive member.

15. The lamp of claim 14 wherein said metallic heat-transmissive member is selected from the group of metals consisting of copper, beryllium, and aluminum.

16. The lamp of claim 14 wherein said magnetic core is annular and said heat-transmissive member is a metal strap bonded to the outside circumference of the core and to one or more of said metal support rods.

17. The lamp of claim 14 wherein said magnetic core is annular and said heat-transmissive member is a flat ring bonded to a flat surface of the core and to one or more of said metal support rods.

18. The lamp of claim 5 further comprising at least one pair of glass encased, metallic starting electrodes, disposed within said envelope, and means for forming a glow discharge between said starting electrodes.

19. The lamp of claim 18 wherein the glow discharge forming means is a glass-coated winding on said magnetic core, the ends of said winding comprising said starting electrodes.

20. The lamp of claim 1 wherein said gaseous medium comprises a mixture of a rare gas with a gas selected from the group consisting of mercury vapor, cadmium vapor, and mixtures thereof.

21. The lamp of claim 20 wherein said rare gas comprises a gas selected from the group consisting of krypton, argon, and mixtures thereof.

22. The lamp of claim 20 wherein the pressure of said gaseous medium is between approximately 0.2 torr and approximately 3.0 torr.

23. The lamp of claim 20 wherein the pressure of said gaseous medium is approximately 1 torr.

24. The lamp of claim 5 wherein said magnetic core is annular and the axis of said magnetic core is substantially parallel to said metal support rods.

25. The lamp of claim 5 wherein said magnetic core is annular and the axis of said magnetic core is substantially perpendicular to said metal support rods.

26. An improved fluorescent lamp comprising:
an evacuable, light-transmissive envelope having a substantially spherical upper shell part and a flat circular base part;
an annular magnetic core of rectangular cross section contained within said envelope, the axis of said core lying substantially perpendicular to the plane of said base part;
a flat metal ring bonded to the surface of said core nearest to said base part;
at least one metallic support rod piercing said base, the ends of said support rods being bonded to said metal ring;
at least one metallic connection member piercing said base;
a first winding on said core, one end of said winding being connected to one of said metallic support rods, an other end of said winding being connected to one of said metallic connection members;
a gaseous medium within said envelope adapted to sustain an electric discharge due to an electric field induced therein by said magnetic core and to emit radiation at a first wavelength when sustaining said discharge;
a luminescent phosphor on the surface of said core and on the interior of said envelope adapted to emit visible light when excited by said first wavelength radiation; and
means for inducing a radio frequency voltage between said one support rod and said one connection member whereby a radio frequency magnetic field is induced in said core and said electric field is induced in said gaseous medium.

27. The lamp of claim 26 wherein said magnetic core comprises ferrite.

28. The lamp of claim 26 wherein said flat metallic ring and said core are coated with a glassy material.

29. The lamp of claim 28 wherein said glassy material is impermeable to gas.

30. The lamp of claim 26 further comprising:
a second winding wrapped on said magnetic core, the ends of said second winding being adapted to support a glow discharge whereby an ionization of said medium is produced.

31. The lamp of claim 30 wherein said second winding is covered with glass.

32. The lamp of claim 28 wherein said radio frequency voltage inducing means comprises a radio frequency power source lying external to said envelope, said radio frequency power source being adapted to supply a radio frequency voltage between said one metallic support rod and said one connection member.

33. The lamp of claim 32 further comprising a substantially cylindrical base element surrounding said radio frequency power source and having a first end and an other end, said first end of said cylindrical base element being attached to said flat, circular base part and said other end of said cylindrical base element being adapted for receipt of electrical energy from a power line source and for transmission of said electrical energy to said radio frequency power source.

34. The lamp of claim 33 wherein said other end of said base member element is adapted for insertion into a lamp socket type power line source for receipt of electrical energy therefrom.

35. The lamp of claim 33 wherein said gaseous medium comprises a mixture of a rare gas with a gas selected from the group consisting of mercury vapor, cadmium vapor, and mixtures thereof.

36. The lamp of claim 35 wherein said rare gas comprises a gas selected from the group consisting of krypton, argon, and mixtures thereof.

37. The lamp of claim 33 wherein said gaseous medium has a pressure of approximately 1 torr.

38. The lamp of claim 33 wherein said radio frequency power source has a frequency of approximately 50 kHz.

39. The lamp of claim 38 wherein said magnetic core has a saturation flux density of at least 1500 gauss at the operating temperature of the lamp.

40. Fluorescent lamp apparatus comprising:
a closed loop magnetic core;
a mass of a gaseous medium linking said core and adapted to sustain an electric discharge due to an electric field induced therein by said core and to emit radiation at a first wavelength when sustaining said discharge;

a substantially spherical, evacuable, light-transmissive envelope containing said mass;

a luminescent phosphor on the surface of said envelope, said phosphor being adapted to emit visible light when excited by said first wavelength radiation; and, means for energizing said core with a radio frequency magnetic field whereby said electric field in induced in said mass.

41. The lamp of claim 40 wherein said magnetic core has a magnetic permeability of at least 40 and a power loss of not more than 50 percent at the operating temperature of said lamp.

42. The lamp apparatus of claim 40 wherein the means for energizing said core comprises a winding linking said core and means for producing a radio frequency electric current in said winding.

43. Apparatus for maintaining an electrical discharge in a gaseous medium contained within an evacuable envelope comprising:

a closed loop magnetic core contained within said envelope;

a winding linking said core and adapted for energizing said core with a radio frequency magnetic field; and means for establising a radio frequency electric current within said winding.

44. The apparatus of claim 43 wherein said magnetic core has a magnetic permeability of at least 40 and a power loss of not more than 50 percent at the operating temperature of said lamp.

45. The apparatus of claim 44 wherein said power loss is not more then 25 percent.

46. The apparatus of claim 45 wherein said magnetic core comprises ferrite.

47. The apparatus of claim 46 wherein said ferrite has a magnetic permeability of at least 2000.

48. The apparatus of claim 45 wherein said core has a saturation magnetic flux density of at least 1500 gauss at the operating temperature of said apparatus.

49. The apparatus of claim 43 wherein the current producing means comprises a plurality of electrically isolated metallic elements piercing said envelope; an end of said winding being connected to one of said elements and an other end of said winding being connected to another of said elements; and a source of radio frequency voltage lying external to said envelope connected between said one and said another metallic element.

50. The apparatus of claim 43 wherein said core is covered with a gas-impermeable material.

51. The apparatus of claim 43 wherein the gaseous medium has a pressure between approximately 0.2 torr and approximately 3.0 torr.

* * * * *